United States Patent
Deines et al.

(10) Patent No.: US 7,230,999 B1
(45) Date of Patent: Jun. 12, 2007

(54) METHOD FOR EXTENDED COHERENT DATA DEMODULATION FOR GPS RECEIVERS

(75) Inventors: Steven D. Deines, Cedar Rapids, IA (US); James C. Maxted, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 767 days.

(21) Appl. No.: 10/429,083

(22) Filed: May 2, 2003

(51) Int. Cl.
*H03K 9/00* (2006.01)
*H04L 27/00* (2006.01)

(52) U.S. Cl. .............. 375/316; 375/340; 701/213; 701/214; 701/215; 329/304

(58) Field of Classification Search ......... 375/134, 375/137, 142, 150, 256, 316, 340; 701/213–215; 329/304
See application file for complete search history.

(56) References Cited

U.S. PATENT DOCUMENTS

| | | | |
|---|---|---|---|
| 4,168,500 A * | 9/1979 | Brassaw | 342/149 |
| 6,078,290 A | 6/2000 | McBurney et al. | 342/417 |
| 6,114,975 A | 9/2000 | Guillard | 340/945 |
| 6,121,923 A | 9/2000 | King | 342/357.12 |
| 6,175,848 B1 | 1/2001 | Riley | 708/300 |
| 6,272,174 B1 | 8/2001 | Murphy | 375/235 |
| 6,295,024 B1 | 9/2001 | King et al. | 342/357.12 |
| 6,300,899 B1 | 10/2001 | King | 352/357.12 |
| 6,384,777 B1 | 5/2002 | McBurney et al. | 342/357.12 |
| 6,437,734 B1 | 8/2002 | McBurney et al. | 342/357.09 |
| 6,970,500 B1 * | 11/2005 | Sanders | 375/150 |
| 7,050,817 B2 * | 5/2006 | Olaker | 455/456.1 |

OTHER PUBLICATIONS

"Interim Guidelines for Examination of Patent Applications for Patent Subject Matter Eligibility".*
Gill, E., *Analysis of Precise Time Data Out Messages for the GEM-S GPS Receiver onboard BIRD*, DLR-GSOC TN 00-02 (Issue Apr. 6, 2000).
Green, Gary & Wollam, Jon, *The Global Positioning System Interference and Navigation Tool (GIANT)*, Veridian, 5200 Springfield Pike, Suite 200, Dayton, OH 45431, retrieved from the Internet website: giant.veridian.com/ftproot/NonRestricted/ GIANT_Paper.pdf.
*GPS Technologies and Alternatives*, Appendix A, pp. 217-235, retrieved from the Internet website: www.rand.org/publications/MR/MR614/MR614.appa.pdf.

* cited by examiner

*Primary Examiner*—Jay K. Patel
*Assistant Examiner*—Curtis Odom
(74) *Attorney, Agent, or Firm*—Nathan O. Jensen; Kyle Eppele

(57) ABSTRACT

A method of performing data detection for a global positioning system (GPS) receiver is disclosed. The method includes receiving a first in-phase (I) reference signal during a first time interval and receiving a first quadrature (Q) reference signal during a first time interval. The method also includes receiving a second in-phase (I) reference signal during a second time interval and receiving a second quadrature (Q) reference signal during a second time interval. The method further includes computing a first sum of the first I reference signal and the second I reference signal, computing a second sum of the first Q reference signal and the second Q reference signal, computing the difference of the first I reference signal and the second I reference signal; and computing the difference of the first Q reference signal and the second Q reference signal.

20 Claims, 3 Drawing Sheets

METHOD FOR EXTENDED COHERENT DATA DEMODULATION FOR GPS RECEIVERS

BACKGROUND

The present invention relates generally to global positioning systems (GPS), and more specifically to improved signal detection acquisition time and low level signal detection for GPS receivers.

One drawback of GPS is often weak signal detection, acquisition time and energy use for operating power. Weak signal detection occurs in places where there is attenuation caused by buildings, trees, or other objects and, further, because the GPS signal is generally weak and received from a satellite at an extraordinary distance. Trees, buildings, and other high-profile objects may cause line of sight interference resulting in the problem of weak or low signal detection.

Conventional GPS signal processing techniques often have problems with bandwidth and signal power. The GPS satellites transmit a relatively weak signal, guaranteed signal levels are only −130 dB-m on the earth's surface, however actual signals as measured on the earth's surface are conventionally about −125 dB-m. The acquisition threshold of some conventional consumer grade GPS receivers are on the order of −137 dB-m, thus the link margin for signal acquisition is only about 7 to 12 dB.

Conventional GPS receivers generally use a sequential detection algorithm to acquire the code division multiple access (CDMA) signals. The acquisition threshold to lower levels may be achieved by lengthening the pre-detection integration (PDI) interval at the expense of acquisition time. Even so, there is a maximum PDI of about 10 milliseconds beyond which the sequential detection process breaks down. This is because the GPS signal structure includes BPSK modulated navigation data (50 BPS) transmitted on top of the 1.023 MHz spreading code that ultimately limits how long one can coherently integrate in order to increase the signal-to-noise ratio (SNR). Beyond 10-20 milliseconds the data bit transitions cause the integration sum to be reduced or go to zero, depending on the phase relationship of the integration period relative to the data bit transition.

Conventional GPS receivers often may be embedded within portable devices, where energy usage is of paramount importance. Such devices include, but are not limited to, mobile telephones, handheld computers, portable computers, surveying devices, and other devices that make use of information provided a GPS receiver. When these embedded GPS receivers operate, they consume a substantial amount of energy, which depletes energy from the battery that could be made use of by the co-embedded functions. If GPS correlation can be done faster, battery energy can be conserved because the GPS receiver may be turned off when correlation is achieved.

Accordingly, there is need for an improved GPS signal acquisition method and system that may operate with weaker signals and may be configured to lock on to satellite signals faster than conventional systems.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One example of the invention relates to a method of performing data detection for a global positioning system (GPS) receiver. The method comprises receiving a first in-phase (I) reference signal during a first time interval and receiving a first quadrature (Q) reference signal during a first time interval. The method also comprises receiving a second in-phase (I) reference signal during a second time interval and receiving a second quadrature (Q) reference signal during a second time interval. The method further comprises computing a first sum of the first I reference signal and the second I reference signal, computing a second sum of the first Q reference signal and the second Q reference signal, computing the difference of the first I reference signal and the second I reference signal, and computing the difference of the first Q reference signal and the second Q reference signal.

Another example of the invention relates to a method of performing data demodulation for a spread spectrum pseudo random noise (PRN) code receiver. The method comprises receiving a first in-phase (I) reference signal during a first time interval and receiving a first quadrature (Q) reference signal during a first time interval. The method also comprises receiving a second in-phase (I) reference signal during a second time interval and receiving a second quadrature (Q) reference signal during a second time interval. The method further comprises computing a first sum of the first I reference signal and the second I reference signal, computing a second sum of the first Q reference signal and the second Q reference signal, computing the difference of the first I reference signal and the second I reference signal, and computing the difference of the first Q reference signal and the second Q reference signal.

Yet another example of the invention relates to a method of detecting downlink data bit transitions for a GPS receiver. The method comprises determining combinations of possible data bit transitions over a time period, computing the power for each of the combinations, and determining the combination corresponding to the highest power.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
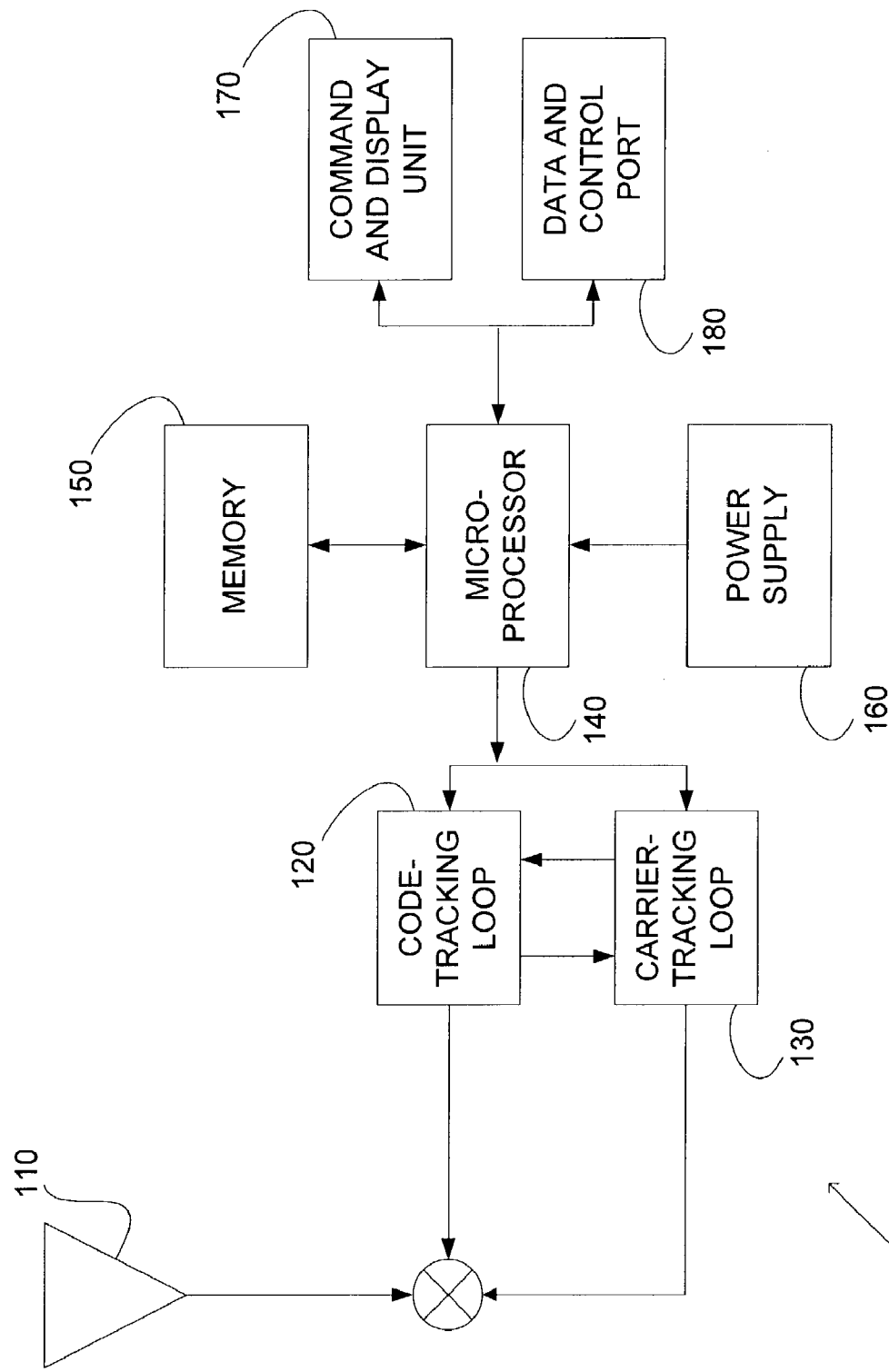
FIG. 1 is an exemplary block diagram of a GPS receiver system.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

The GPS constellation includes 24 satellites and 6 orbital planes. The satellites orbit the earth with a period of 12 hours in circular 10,900 nautical mile (nmi) orbits at an inclination of 55 degrees with respect to the Equator. Each satellite passes over the same location on earth about once every day (or every 23 hours and 56 minutes). Spacings of the satellites in orbit are arranged so that a minimum of five satellites are in view to users worldwide with a position dilution of precision (PDOP) of six or less.

GPS satellites transmit two codes: the precision or P-code and the course acquisition or C/A-code. The codes are modulated onto spread-spectrum transmissions (direct-sequence pseudorandom binary codes) at two different frequencies: the L1 band transmits both the C/A- and P-codes at a frequency of 1575.42 MHz; the L2 band transmits the P-code only at a frequency of 1227.6 MHz. Alternatively, other and/or additional codes may be transmitted in alternative GPS systems and other frequencies may be used for transmission.

The P-code is designed for military users and is a pseudorandom number sequence that is approximately $6 \times 10^{12}$ bits long, with a bandwidth of 10.23 MHz. The long length of the code makes it hard to acquire and difficult to spoof. The P-code is also more accurate than the C/A code and is more difficult to jam because of its wider bandwidth. To ensure that unauthorized users do not acquire the P-code, the United States can implement an encryption segment on the P-code called anti-spoofing (AS). The P-code with AS, designated the Y-code, is available only to users with the correct deciphering chips.

The C/A-code, designed for civilian or military users, is a 1023-bit PRN code with a bandwidth of 1.023 MHz. Less accurate and easier to jam than the P-code, the C/A-code is also easier to acquire, so many military receivers track the C/A-code first and then transfer the P-code.

Generally, GPS works by timing how long it takes coded radio signals to reach the earth from its satellites. A receiver does this by generating a set of codes identical to those transmitted by the system's satellites. The receiver calculates the time delay between its codes and the codes received from the GPS satellites by determining how far it has to shift its own code to match those transmitted by the satellites. This travel time is then multiplied by the speed of light to determine the receiver's distance from the satellites. A GPS receiver could, in theory, calculate its three-dimensional position by measuring its distance from three different satellites, but in practice a fourth satellite is necessary because there is a timing offset between the clocks in a receiver and those in a satellite. The fourth measurement allows a receiver's computer to solve for the timing offset and eliminate it from the navigation solution.

GPS satellites transmit a 50-bit-per-second data stream which is superimposed on the C/A- and P-codes via modulo-two addition. Once a receiver has matched its code to the code of a satellite, it can begin to decipher that satellite's data message. A satellite's entire data message lasts 12½ minutes. The message includes a 30-second frame repeated 25 times. The 30-second frame contains 5 subframes, each lasting 6 seconds (i.e., each having 300 bits of information). The subframes are further subdivided into 10 mini-subframes lasting 0.6 seconds (30 bits).

Referring now to FIG. 1, a GPS receiver system 100 may include an antenna and preamplifier 110. Antenna/preamplifier 110 receives a GPS signal from a GPS satellite. Receiver 100 also includes a code tracking loop 120 and a carrier tracking loop 130. Code tracking loop 120 and carrier tracking loop 130 track the code signal and the carrier signal respectively, that is changing either in frequency or in time. Each of the tracking loops 120 and 130 includes feedback that compares an incoming signal through antenna 110 against an internally-produced signal. An error signal is generated, which is the difference between the received signal and the internal signal and uses the signal to adjust the internal signal to match the external one in such a way that the error is reduced to zero or is minimized. Code tracking loop 120 provides measurements of pseudorange by using a delay-lock loop (DLL). Pseudorange measurements are obtained by determining the time delay between the locally-generated PRN code sequence and the PRN code (either P- or C/A-code) arriving from a given satellite. Once the DLL has locked onto the satellite signal (i.e., aligned the two PRN codes), it can de-spread that signal by multiplying it with the locally-generated duplicate and passing the resultant product through a band pass filter.

The incoming satellite signal then passes to the carrier-tracking loop for data demodulation. The loop aligns the phase of the receiver's local oscillator with the phase of the de-spread satellite signal (known as the intermediate frequency or IF signal). Because carrier-tracking loops need to follow the phase of the two signals, they conventionally utilize phase-lock loops (PLL).

Once the oscillator locks onto the satellite signal, it will continue to follow the variations in the phase of the carrier as the range to the satellite changes. By tracking the rate of change of the carrier phase over time, one can obtain estimates for the velocity of a moving GPS receiver. Finally, once the PLL has locked onto the phase of the satellite signal, the incoming data message can be decoded using standard techniques of bit synchronization and a data detection filter.

In addition to the tracking loops 120 and 130, receiver 100 includes a microprocessor 140 for controlling the operations of receiver 140. Microprocessor 140 is coupled to a memory device 150 and a power supply 160. Further, users may provide input to and receive output from a command and display unit 170 and via a data and control port 180.

A GPS receiver may operate in a variety of states including the following. State 1: Normal Acquisition. The receiver tries to acquire the C/A signal using Doppler estimates derived from satellite almanac data plus present position, velocity, and time inputs from the host vehicle. Subsequent to reading and verifying the hand-over-word (HOW) in the GPS data message, the receiver will acquire and track the P-code.

State 2: Direct Acquisition. The receiver acquires the P-code directly without first acquiring the C/A-code. Precise time inputs, as well as position, velocity, frequency, and phase estimates are required.

State 3: Code Lock. The receiver maintains code lock but is unable to maintain precise carrier tracking. In addition, pseudorange measurements are coarse. The receiver reverts to State 4 or 5 when dynamic excursions or jamming levels do not exceed the carrier tracking thresholds.

State 4: Carrier Lock. The receiver maintains carrier lock. Both pseudorange and pseudo-delta-range measurements will be less than full accuracy. Data may be demodulated.

State 5: Carrier Track/Data Demodulation. The receiver precisely tracks the carrier and is able to demodulate system data from the carrier. Pseudorange and pseudo-delta-range measurements are made to full accuracy.

State 6: Sequential Resynchronization. The receiver serially measures pseudorange and pseudo-delta-range to the GPS satellites. Receivers with continuous tracking do not have this state.

State 7: Signal Reacquisition. This state is reached only when a receiver has been in tracking state (e.g., State 5) but has subsequently lost the lock of the GPS signal. Receiver in State 7 is in search mode while it tries to reacquire the signal as lost.

Thus, a receiver that has locked onto GPS signals fully is in State 5. A receiver in State 3 can still function, but its performance will be degraded unless it obtains velocity aiding from an inertial navigation system (INS) (to replace the carrier-derived pseudo-delta-range measurements).

In global positioning satellite receivers, one or more correlators are used to "lock" or "align" a reference signal generated by the receiver with a received satellite signal so that information from the received satellite signal can be obtained. The received satellite signal has carrier and code components which are tracked by the receiver. Each correlator continuously compares the received satellite signal with a particular reference signal and generates a correlation signal indicating the ongoing result of the comparison. The power of this correlation signal is measured and is repeatedly or continuously accumulated for a period of time called a "pre-detection interval" (PDI). The signal powers measured by the receiver are usually represented by voltage within the circuitry of the receiver. The time period of the pre-detection interval is selected so that the spread-spectrum signal transmitted by the global positioning satellites can be discerned from any noise interference in the received satellite signal.

Under normal conditions, conventional GPS receivers may be limited to a maximum coherent integration PDI of 20 milliseconds, which is the downlink 50-bit-per-second data bit interval. Coherent integration across the downlink data bit interval introduces 180-degree phase reversals into the integration and results in loss of signal.

Therefore, depending upon the application, coherent PDIs that are greater than 20 milliseconds may be advantageous because the effective frequency window is narrowed, which reduces the in-band noise, etc. Data stripping, also known as data wipe-off, is the conventional technique that is known which allows narrowing of the frequency window. However, data stripping assumes prior knowledge of the downlink data bit values. With prior knowledge information, coherent integration can extend across the downlink data bit boundaries by either adding or subtracting the 20 millisecond integration counter-values to or from the PDI sums, depending on the data bit value during that 20-millisecond interval. For example, data stripping can be summarized as follows:

At t=0:

$I_{sum}=0$ $Q_{sum}=0$

For t=1 to n (n is number of 20 ms intervals in PDI)

If $BIT_t=0$ then:

$I_{sum}=I_{sum}+I_t$ $Q_{sum}=Q_{sum}+Q_t$ else $I_{sum}=I_{sum}-I_t$ $Q_{sum}=Q_{sum}-Q_t$ where $I_t$ and $Q_t$ are the 20 ms outputs of the pre-detection integration counters.

The disadvantage to conventional data stripping, however, is that the downlink data (the ephemeris and clock corrections in particular) change every hour, which then requires new data in order to continue the data stripping.

Thus, a PDI integration that extends across multiple 20-millisecond downlink data bit boundaries by effectively doing downlink data bit prediction, does not require prior knowledge of the downlink data bits, and is therefore advantageous.

In accordance with an exemplary embodiment, for example, for a 40-millisecond PDI, two data bits are spanned. Thus, there will be either a single data bit change after 20 milliseconds or no data bit transition over the entire 40-millisecond interval. Thus, there are two possible outcomes and two possible ways that the intermediate 20-millisecond I & Q integration counters can be combined. The possible combinations are as follows:

No data bit transition:

$I_N=I_0+I_1$ $Q_N=Q_0+Q_1$

One data bit transition:

$I_t=I_0-I_1$ $Q_t=Q_0-Q_1$

Thus, in accordance with the invention, both possible combinations are computed, and a determination is made as to the existence or absence of a data bit transition is made.

After both sets of 40-millisecond sums are computed, power detection is performed on both sets of I & Q values. Ideally (i.e., with no noise), one of the two detected power values will be the maximum signal power over the 40-millisecond interval. The other will be zero. This then will indicate if a bit transition occurred in the center of the 40-millisecond interval, that is, if the power is detected the maximum power 210 of FIG. 2. The power computation using the maximum power set will then determine if a bit transition occurred at the beginning of the 40-millisecond interval. Given both pieces of information, both of the downlink data bits for the 40-millisecond interval can be determined.

Figure 2:
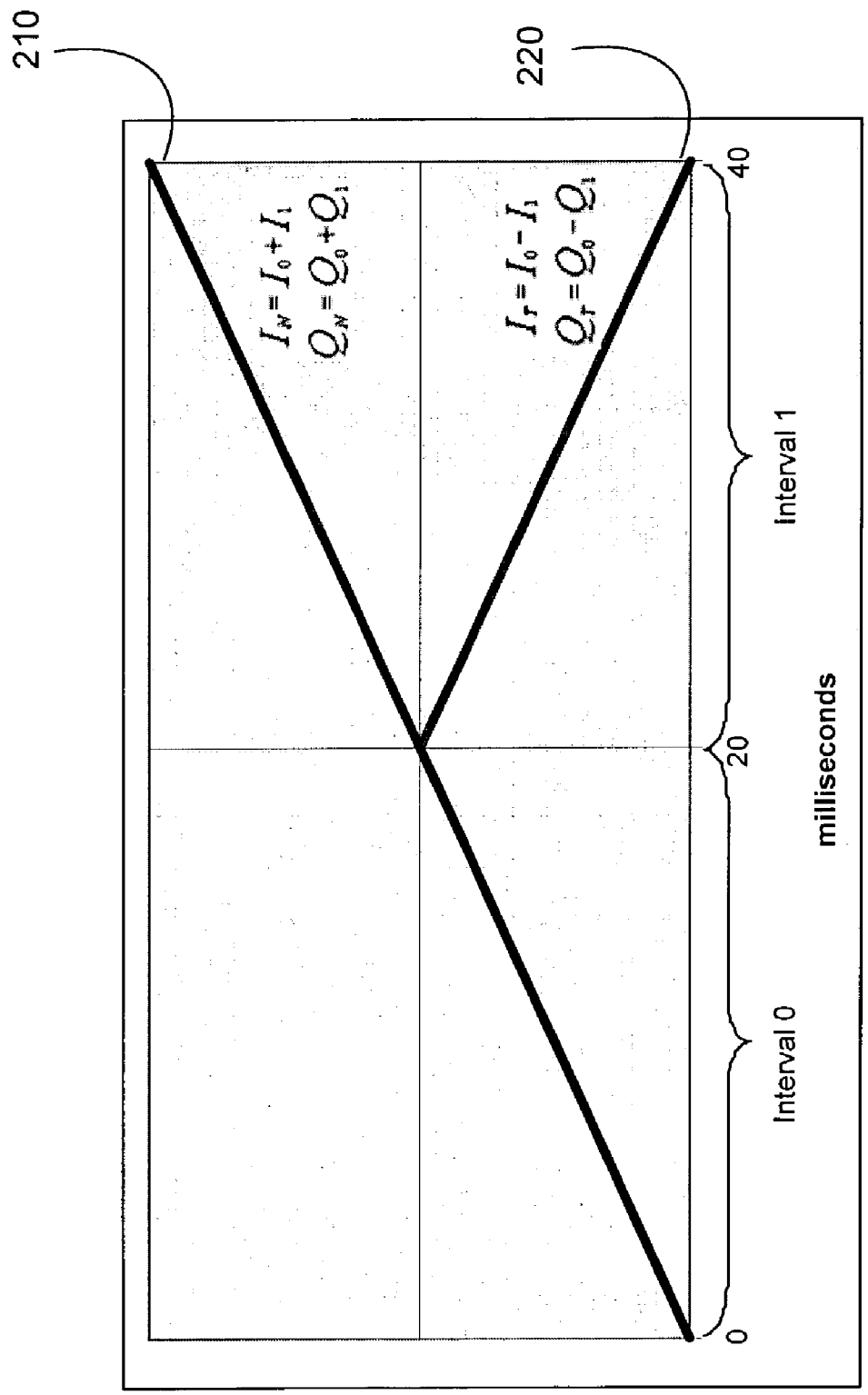
FIG. 2 is an exemplary diagram of the possible integration results for a 40-millisecond interval in a data prediction system.

Referring to FIG. 2, there are two possible integration results after 40 milliseconds, the first being at point 210, and the second being at point 220 at which the result is zero.

Ideally, this technique may be extended over multiple 20-millisecond intervals (i.e., 40, 60, 80, 100, . . . ).

Figure 3:
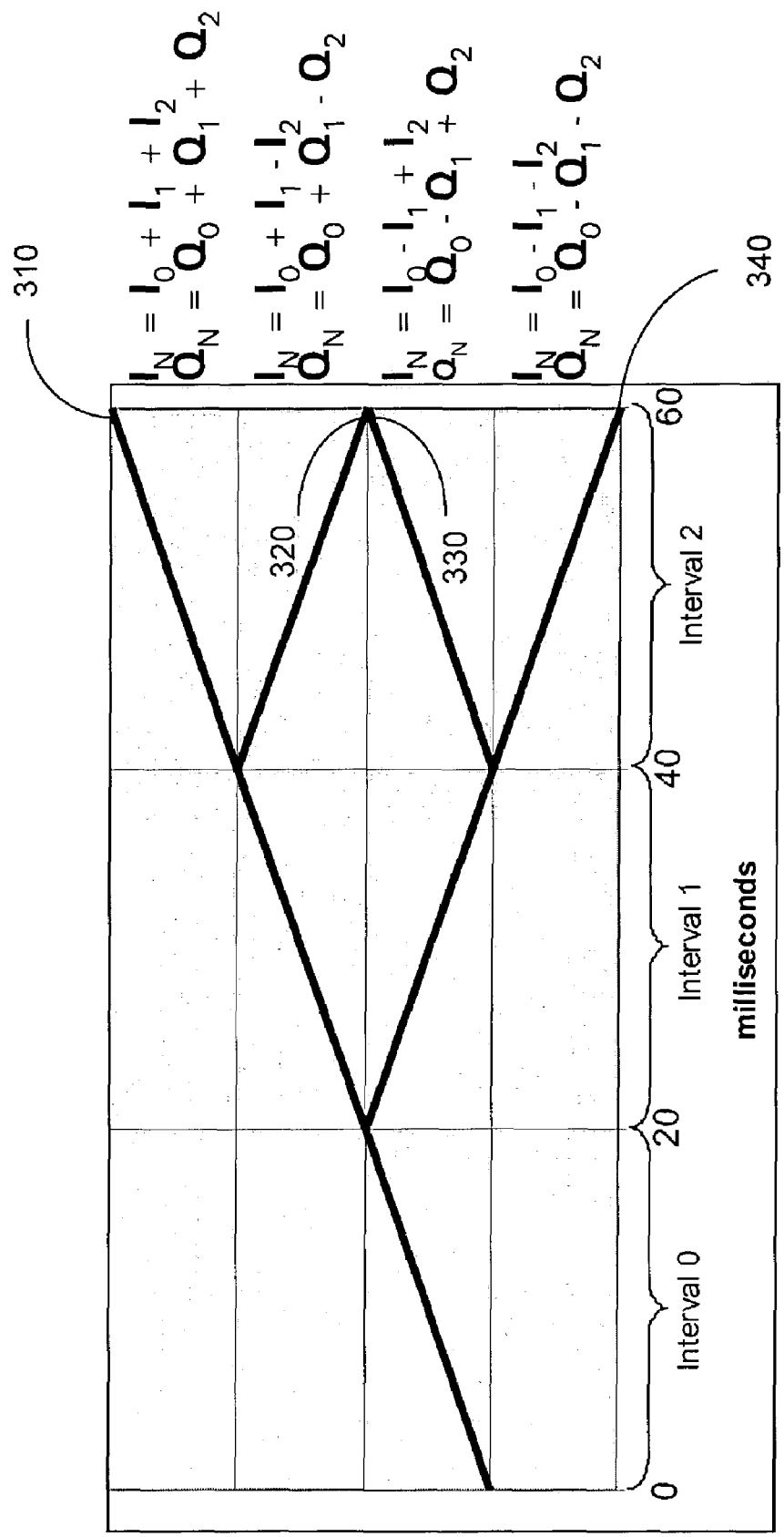
FIG. 3 is an exemplary diagram depicting four possible integration results over a 60-millisecond interval in a data prediction system.

According to an exemplary embodiment, there are four possible equation sets for the 60-millisecond case which is depicted in FIG. 3. The following are the four possible equation sets for the 60-millisecond case:

No data bit transition:

$$I_N = I_0 + I_1 + I_2$$

$$Q_N = Q_0 + Q_1 + Q_2$$

One data bit transition:

$$I_N = I_0 + I_1 - I_2$$

$$Q_N = Q_0 + Q_1 - Q_2$$

One data bit transition:

$$I_N = I_0 - I_1 - I_2$$

$$Q_N = Q_0 - Q_1 - Q_2$$

Two data bit transitions:

$$I_N = I_0 - I_1 + I_2$$

$$Q_N = Q_0 - Q_1 + Q_2$$

with the four possible exemplary integration power results 310, 320, 330, and 340 being depicted in FIG. 3.

FIGS. 2 and 3 depict exemplary GPS signal power losses that might occur over a 40- and 60-millisecond interval, respectively, with every break point corresponding to a data bit transition. In the example depicted, only if all of the summed 20-millisecond I & Q segments have the same phase (i.e., no bit transitions) is the maximum potential signal power realized. Each bit transition causes a phase reversal and a change in the slope of the integration function. However, in other situations the maximum potential signal power may correspond to a set of equations in which there was a data bit change. When it is determined which set of equations results in maximum power, the order and existence of data bit changes in the downlink data bits may be extracted.

Previous techniques to allow coherent integration across the downlink data bit boundaries have assumed apriori knowledge of the contents of the downlink data stream. The technique disclosed herein (known as data prediction) allows extended coherent integration by forming all possible extended coherent integration summations based upon the possible data bit transitions over the interval. At the interval end, the resulting summations are examined, and the one yielding the greatest detected power is used to determine the corresponding downlink data bits.

For example, given two 20-millisecond intervals ending at $t_{20}$ and $t_{40}$ and their associated coherent integration components $I_0$ $Q_0$ and $I_1$ $Q_1$, it is known that at the beginning of each 20-millisecond interval there is either experienced a data bit transition or not. Of the four possible combinations to have no data bit transitions at $t_{20}$ and the associated 40-millisecond I & Q sums are therefore $I_N = I_0 + I_1$, $Q_N = Q_0 + Q_1$.

For the two other cases, a data transition does occur at $t_{20}$ and the associated 40-millisecond I & Q sums are therefore $I_c = I_0 - I_1$, $Q_c = Q_0 - Q_1$. In the data prediction context, both sets of values are computed and then the detected power is examined. In one case, all of the received signal power will be seen and the other will be ideally zero. The set corresponding to the maximum power therefore determines the presence or absence of a downlink data bit transition at time $t_{20}$. Further, the determination of the presence or absence of a downlink data bit transition at time to is done by examining the total phase change of the signal over the 40-millisecond interval, again using the data set corresponding to the maximum power. A phase change of greater than ±90 degrees indicates the occurrence of a data bit transition at time to.

The above described techniques may be applied to systems using spread spectrum signal having data modulated on top of the direct PRN code. Further, the techniques improve signal acquisition and detection in low signal to noise ratio environments as well as aid in the demodulation of the downlink data that is superimposed on the PRN code. Also, although 40 ms and 60 ms [2 and 3 data intervals, respectively] examples are provided, the technique may be extended to n data intervals, although the problem will become exponentially complex.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the electronic devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of facilitating data detection for a global positioning system (GPS) receiver, the method comprising:
    electronically receiving a first in-phase (I) reference signal during a first time interval;
    electronically receiving a first quadrature (Q) reference signal during the first time interval;
    electronically receiving a second in-phase (I) reference signal during a second time interval;
    electronically receiving a second quadrature (Q) reference signal during the second time interval;
    electronically computing a first sum of the first I reference signal and the second I reference signal;
    electronically computing a second sum of the first Q reference signal and the second Q reference signal;
    electronically computing a first difference of the first I reference signal and the second I reference signal;
    electronically computing a second difference of the first Q reference signal and the second Q reference signal; and
    determining at least one data bit transition using a first power based upon at least the first sum and the second sum and a second power based upon the first difference and the second difference.

2. The method of claim 1, further comprising:
    generating the first power based on the first sum and the second sum.

3. The method of claim 2, further comprising:
    generating a second power based on the first difference and the second difference.

4. The method of claim 3, further comprising:
    comparing the first power and the second power.

5. The method of claim 4, further comprising:
    determining the occurrence of the at least one data bit transition after the first time interval.

6. The method of claim 1, further comprising:
    receiving a third I reference signal during a third time interval;

receiving a third Q reference signal during the third time interval;

computing four combinations of bit transition possibilities based on the first, second and third I and Q reference signals.

7. The method of claim 6, further comprising:

generating a first, second, third, and fourth powers based on the four combinations.

8. The method of claim 7, further comprising:

determining the greatest power of the first, second, third and fourth powers.

9. The method of claim 8, further comprising:

determining the bit transitions after the first and second time intervals based on the greatest power.

10. A method of facilitating data demodulation for a spread spectrum pseudo random noise (PRN) code receiver, the method comprising:

electronically receiving a first in-phase (I) reference signal during a first time interval from an in-phase correlator whose inputs include a modulated data signal from an external source and a generated in-phase signal;

electronically receiving a first quadrature (Q) reference signal during the first time interval;

electronically receiving a second in-phase (I) reference signal during a second time interval;

electronically receiving a second quadrature (Q) reference signal during the second time interval;

electronically computing a first sum of the first I reference signal and the second I reference signal;

electronically computing a second sum of the first Q reference signal and the second Q reference signal;

electronically computing a first difference of the first I reference signal and the second I reference signal;

electronically computing a second difference of the first Q reference signal and the second Q reference signal; and determining at least one data bit transition using a first power based upon at least the first sum and the second sum and a second power based upon at least the first difference and the second difference.

11. The method of claim 10, further comprising:

generating the first power based on the first sum and the second sum.

12. The method of claim 11, further comprising:

generating the second power based on the first difference and the second difference.

13. The method of claim 12, further comprising:

comparing the first power and the second power.

14. The method of claim 13, further comprising:

determining the occurrence of a data bit transition after the first time interval.

15. The method of claim 10, further comprising:

receiving a third I reference signal during a third time interval;

receiving a third Q reference signal during the third time interval;

computing four combinations of bit transition possibilities based on the first, second, and third I and Q reference signals.

16. A method of facilitating the detection of downlink data bit transitions for a GPS receiver, the method comprising:

electronically determining combinations of possible data bit transitions over a time period;

electronically computing the power for each of the combinations of possible data bit transitions;

electronically determining the combination corresponding to the highest power by using at least a first sum of the first I signal during a first time interval and a second I signal during a second time interval and a second sum of a first Q signal during the first time interval and a second Q signal during the second time interval, and at least a first difference of the first I signal and the second I signal and a second difference of the first Q signal and the second Q signal to detect at least one data bit transition.

17. The method of claim 16, further comprising:

extracting the downlink data bit transitions for the combination corresponding to the highest power.

18. The method of claim 16, wherein the time period is 40 milliseconds.

19. The method of claim 16, wherein the time period is 60 milliseconds.

20. The method of claim 16, wherein the time period is greater than 60 milliseconds.

* * * * *